(12) United States Patent
Nolan et al.

(10) Patent No.: US 7,247,396 B2
(45) Date of Patent: Jul. 24, 2007

(54) HIGHLY ORIENTED PERPENDICULAR MAGNETIC RECORDING MEDIA

(75) Inventors: Thomas Patrick Nolan, Fremont, CA (US); Erol Girt, Berkeley, CA (US); Chunghee Chang, Fremont, CA (US); Qixu Chen, Milpitas, CA (US); Li-Lien Lee, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 218 days.

(21) Appl. No.: 10/764,602

(22) Filed: Jan. 27, 2004

(65) Prior Publication Data

US 2004/0258962 A1     Dec. 23, 2004

Related U.S. Application Data

(60) Provisional application No. 60/444,069, filed on Jan. 30, 2003.

(51) Int. Cl.
*G11B 5/738* (2006.01)

(52) U.S. Cl. .................. 428/831.2; 428/831; 428/656; 428/661; 428/664; 428/669; 428/670; 428/671; 428/672; 428/673; 428/674; 428/675; 428/676; 428/212; 428/336

(58) Field of Classification Search ............ None
See application file for complete search history.

(56) References Cited

U.S. PATENT DOCUMENTS

| | | | |
|---|---|---|---|
| 4,743,491 A | 5/1988 | Asada et al. | |
| 5,536,585 A | 7/1996 | Futamoto et al. | |
| 5,599,580 A | 2/1997 | Futamoto et al. | |
| 5,626,970 A | 5/1997 | Hedgcoth | |
| 5,685,958 A | 11/1997 | Futamoto et al. | |
| 5,738,927 A | 4/1998 | Nakamura et al. | |
| 5,759,681 A | 6/1998 | Hosoe et al. | |
| 5,830,569 A | 11/1998 | Hikosaka et al. | |
| 5,872,690 A | 2/1999 | Tadokoro et al. | |
| 5,922,456 A | 7/1999 | Tanahashi et al. | |
| 5,968,679 A | 10/1999 | Kobayashi et al. | |
| 6,020,060 A | 2/2000 | Yoshida et al. | |

(Continued)

FOREIGN PATENT DOCUMENTS

WO      WO 99/24973      5/1999

*Primary Examiner*—Kevin M. Bernatz
(74) *Attorney, Agent, or Firm*—McDermott Will & Emery LLP

(57) ABSTRACT

A perpendicular magnetic recording medium including an interlayer structure for crystallographically orienting a layer of a hexagonal close-packed (hcp) perpendicular magnetic recording material formed thereon, comprising in overlying sequence from a surface of a magnetically soft underlayer:

(1) a first crystalline layer of a material having a first lattice parameter and a strong preferred growth orientation;

(2) a second crystalline layer of a material having a second lattice parameter and the same strong preferred growth orientation as the first crystalline layer; and (3) a third crystalline layer of an hcp material, having a [0002] lattice parameter similar to or different from that of the second lattice parameter of the second crystalline layer and a strong <0002> preferred growth orientation, wherein:

the second crystalline layer has a lower interfacial energy with the first crystalline layer and a higher interfacial energy with the third crystalline layer, owing to a lower surface energy of the first crystalline layer and a higher surface energy of the second crystalline layer.

24 Claims, 2 Drawing Sheets

U.S. PATENT DOCUMENTS

| | | |
|---|---|---|
| 6,126,760 A | 10/2000 | Oishi et al. |
| 6,183,893 B1 | 2/2001 | Futamoto et al. |
| 6,248,416 B1 | 6/2001 | Lambeth et al. |
| 6,428,906 B1 | 8/2002 | Wong et al. |
| 6,673,475 B2 | 1/2004 | Oikawa et al. |
| 6,794,028 B2 | 9/2004 | Uwazumi et al. |
| 7,067,206 B2 | 6/2006 | Uwazumi et al. |
| 2001/0009730 A1 | 7/2001 | Futamoto et al. |
| 2002/0058161 A1 | 5/2002 | Yamamoto et al. |
| 2002/0064691 A1 | 5/2002 | Kanbe et al. |
| 2003/0022023 A1 | 1/2003 | Carey et al. |
| 2004/0258963 A1* | 12/2004 | Nolan .................. 428/694 TS |

* cited by examiner

US 7,247,396 B2

HIGHLY ORIENTED PERPENDICULAR MAGNETIC RECORDING MEDIA

CROSS-REFERENCE TO PROVISIONAL APPLICATION

This application claims priority from U.S. provisional patent application Ser. No. 60/444,069 filed Jan. 30, 2003, the entire disclosure of which is incorporated herein by reference.

FIELD OF THE INVENTION

The present invention relates to high areal recording density perpendicular magnetic recording media comprising improved fcc Au-containing interlayer structures for enhancing formation of main recording layers having optimum crystallographic orientation. The invention is of particular utility in the manufacture of data/information storage and retrieval media, e.g., hard disks, having ultra-high areal recording/storage densities.

BACKGROUND OF THE INVENTION

Magnetic media are widely used in various applications, particularly in the computer industry, and efforts are continually made with the aim of increasing the areal recording density, i.e., bit density of the magnetic media. Conventional thin-film type magnetic recording media, wherein a fine-grained polycrystalline magnetic alloy serves as the active recording layer, are generally classified as "longitudinal" or "perpendicular", depending upon the orientation of the magnetic domains of magnetic material. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

It is well-known that efficient, high bit density recording utilizing a perpendicular magnetic medium requires interposition of a relatively thick (i.e., as compared to the magnetic recording layer), magnetically "soft" underlayer or "keeper" layer, i.e., a magnetic layer having a relatively low coercivity below about 1 kOe, between a non-magnetic substrate and a "hard" magnetic recording layer having perpendicular anisotropy and a relatively high coercivity of several kOe, typically about 3–6 kOe. The magnetically soft underlayer (e.g., of a NiFe alloy such as Permalloy) serves to guide magnetic flux emanating from the head through the hard, perpendicular magnetic recording layer, typically comprised of a Co-based alloy material, such as CoCr. In addition, the magnetically soft underlayer reduces susceptibility of the medium to thermally-activated magnetization reversal by reducing the demagnetizing fields which lower the energy barrier that maintains the current state of magnetization.

A typical conventional perpendicular recording system 10 utilizing a vertically oriented magnetic medium 1 with a relatively thick soft magnetic underlayer, a relatively thin hard magnetic recording layer, and a single-pole head, is illustrated in FIG. 1, wherein reference numerals 2, 3, 4, and 5, respectively, indicate a non-magnetic substrate, a soft magnetic underlayer, at least one non-magnetic interlayer, and a perpendicular hard magnetic recording layer. Reference numerals 7 and 8, respectively, indicate the single and auxiliary poles of a single-pole magnetic transducer head 6.

The relatively thin interlayer 4 (also referred to as an "intermediate" layer), comprised of one or more layers of non-magnetic materials, serves to (1) prevent magnetic interaction between the soft underlayer 3 and the hard recording layer 5 and (2) promote desired microstructural and magnetic properties of the hard recording layer.

As shown by the arrows in the figure indicating the path of the magnetic flux $\phi$, flux $\phi$ is seen as emanating from single pole 7 of single-pole magnetic transducer head 6, entering and passing through vertically oriented, hard magnetic recording layer 5 in the region below single pole 7, entering and travelling along soft magnetic underlayer 3 for a distance, and then exiting therefrom and passing through the perpendicular hard magnetic recording layer 5 in the region below auxiliary pole 8 of single-pole magnetic transducer head 6. The direction of movement of perpendicular magnetic medium 1 past transducer head 6 is indicated in the figure by the arrow above medium 1.

With continued reference to FIG. 1, vertical lines 9 indicate grain boundaries of each polycrystalline (i.e., granular) layer of the layer stack constituting medium 1. A protective overcoat layer 11, such as of a diamond-like carbon (DLC) is formed over hard magnetic layer 5, and a lubricant topcoat layer 12, such as of a perfluoropolyethylene material, is formed over the protective overcoat layer. Substrate 2 is typically disk-shaped and comprised of a non-magnetic metal or alloy, e.g., an Al-based alloy, such as Al—Mg having an Ni—P plating layer on the deposition surface thereof, or substrate 2 is comprised of a suitable glass, ceramic, glass-ceramic, polymeric material, or a composite or laminate of these materials. Underlayer 3 is typically comprised of an about 500 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, FeCoC, etc. Interlayer 4 typically comprises an up to about 300 Å thick layer of a non-magnetic material, such as TiCr. Hard magnetic layer 5 is typically comprised of an about 100 to about 250 Å thick layer of a Co-based alloy including one or more elements selected from the group consisting of Cr, Fe, Ta, Ni, Mo, Pt, V, Nb, Ge, B, and Pd, iron nitrides or oxides, or a (CoX/Pd or Pt)$_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, Pt, W, and Fe, and each of the alternating thin, non-magnetic layers of Pd or Pt is up to about 10 Å thick. Each type of hard magnetic recording layer material has perpendicular anisotropy arising from magneto-crystalline anisotropy ($1^{st}$ type) and/or interfacial anisotropy ($2^{nd}$ type).

Notwithstanding the improvement (i.e., increase) in areal recording density and SMNR afforded by perpendicular magnetic recording media as described supra, the escalating requirements for increased areal recording density, media stability and SMNR necessitate further improvement in media performance.

As indicated above, perpendicular magnetic recording media typically include a magnetically soft underlayer for guiding magnetic flux through the media and to enhance writability, a thin intermediate or interlayer, and a main recording layer. The role of the intermediate or interlayer is critical for obtaining good media performance. Specifically, in perpendicular magnetic recording media the intermediate or interlayer serves to provide:

1. control of the crystallographic orientation of the main recording layer;

2. control of the grain size and grain distribution of the main recording layer; and 3. physical separation between adjacent grains of the main recording layer, which feature is particularly desirable and important when the latter is formed by a low temperature and/or reactive sputtering process that forms a metal oxide material in the boundaries between adjacent grains.

More specifically, the SMNR of perpendicular magnetic recording media is improved by increasing the strength of the preferred c-axis out-of-plane orientation of the perpendicular main recording layer while maintaining a small uniform grain size of the layer. The preferred orientation of the magnetic layer depends upon the structural properties of and the interactions between the various previously deposited underlying layers of the media, as well as upon the nature of the substrate.

In general, control of the strength (or amount) of the preferred orientation of thin-film layers is difficult. Formation of a Co-alloy magnetic recording layer with a strong <0002> growth orientation on a structure including a substrate, a soft magnetic underlayer, and non-magnetic spacer, intermediate, or underlayer(s) between about 0.2 and 40 nm thick is extremely difficult.

Differences in crystallographic orientation between adjacent thin film layers are affected by the surface and interfacial energies of the materials of the layers, and by heteroepitaxial (or coherent) growth of one layer upon another layer of a chemically distinct material with related crystal lattice structure and atomic interplanar spacings.

The soft magnetic underlayer of perpendicular magnetic recording media generally is composed of a small grain or amorphous material containing at least one of Fe and Co. According to prior practice, a non-magnetic material of hcp structure, e.g., Ru, may be deposited on the soft magnetic underlayer, which non-magnetic hcp material grows with a moderately strong <0002> preferred orientation and small grain size. A magnetic material of hcp structure, typically a Co-based alloy, may grow coherently on the hcp non-magnetic layer, also with <0002> growth orientation and small grain size. The quality of the <0002> growth orientation can be determined from the size of symmetric X-ray diffraction peaks and X-ray rocking curves. Strong preferred growth orientation of the Co-based alloy with the hcp <0002> axis out-of-plane is generally necessary for achieving good performance of high areal recording density perpendicular magnetic media. Unfortunately, however, the quality of growth orientation of an hcp material upon the soft magnetic underlayer depends upon the selected material, and prior intermediate or underlayer structures, such as with a Ru layer and a Co-alloy layer generally have not afforded the desired strength of <0002> growth orientation.

In view of the foregoing critical nature of the intermediate or interlayer in perpendicular magnetic recording media, there exists a clear need for improved layer structures for facilitating highly oriented crystal growth thereon and for highly oriented perpendicular magnetic recording media with enhanced performance characteristics, comprising improved intermediate or interlayer structures.

The present invention, therefore, addresses and solves problems attendant upon the design and manufacture of improved layer structures for facilitating highly oriented crystal growth and fabrication of high performance, ultra-high areal recording density perpendicular magnetic recording media, while maintaining full compatibility with the economic requirements of cost-effective, large-scale automated manufacturing technology.

DISCLOSURE OF THE INVENTION

An advantage of the present invention is an improved layer structure for crystallographically orienting a layer of a hexagonal close-packed (hcp) material formed thereon.

Another advantage of the present invention is an improved layer structure for providing a layer of a hexagonal close-packed (hcp) material formed thereon with a strong <0002> growth orientation.

Yet another advantage of the present invention is an improved layer structure for providing a layer of a hexagonal close-packed (hcp) Co-based perpendicular magnetic recording layerl formed thereon with a strong <0002> growth orientation.

A further advantage of the present invention is an improved perpendicular magnetic recording medium, comprising an improved interlayer structure for crystallographically orienting a layer of a hexagonal close-packed (hcp) perpendicular magnetic recording material formed thereon.

A still further advantage of the present invention is an improved perpendicular magnetic recording medium, comprising an improved interlayer structure for providing a layer of a hexagonal close-packed (hcp) Co-based perpendicular magnetic recording material formed thereon with a strong <0002> growth orientation.

These and additional advantages and other features of the present invention will be set forth in the description which follows and in part will become apparent to those having ordinary skill in the art upon examination of the following or may be learned from the practice of the present invention. The advantages of the present invention may be realized as particularly pointed out in the appended claims.

According to an aspect of the present invention, the foregoing and other advantages are obtained in part by a layer structure for crystallographically orienting a layer of a hexagonal close-packed (hcp) material formed thereon, comprising in overlying sequence:

(a) a first crystalline layer of a material having a first lattice parameter and a strong preferred growth orientation;

(b) a second crystalline layer of a material having a second lattice parameter and the same strong preferred growth orientation as the first crystalline layer; and (c) a third crystalline layer of a hcp material having a lattice parameter similar to or different from the second lattice parameter of the second crystalline layer and a strong preferred growth orientation;

wherein the second crystalline layer has a lower interfacial energy with the first crystalline layer and a higher interfacial energy with the third crystalline layer, owing to a lower surface energy of the first crystalline layer a higher interfacial energy with the third crystalline layer.

In accordance with embodiments of the invention, the lower surface energy of the first crystalline layer is not greater than about 2.0 J/m$^2$ and the higher surface energy of the second crystalline layer is not less than about 2.7 J/m$^2$.

According to preferred embodiments of the invention, the third crystalline layer of a hcp material has a [0002] lattice parameter similar to or different from the second lattice parameter of the second crystalline layer and a strong <0002> preferred growth orientation. The second lattice parameter of the second crystalline layer is similar to or different from that of the first lattice parameter of the first crystalline layer. The first crystalline layer has a melting temperature ($T_m$) not greater than about 2,100° C. and the second crystalline layer has a melting temperature ($T_m$) not less than about 2,100° C. The first crystalline layer is from about 1 to about 50 nm thick and comprises at least one material selected from the group consisting of: Al, Ag, Au, Cu, Zn, Ni, Ti, Pd, Pt, Mg, Ca, Be, Sc, Sr, La, Zr, Rh, Cd, Tl, Pb, Se, Te, Gd, Nd, Pr, Tb, Dy, Ho, Er, Tm, Yb, Lu, Mn, Fe, Cr, and alloys thereof. The second crystalline layer is from about 1 to about 50 nm thick and comprises at least one material selected from the group consisting of: Ru, Re, Ir, Os, Co, Pt, Ti, Hf, Th, Gd, Mo, Nb, Ta, W, and alloys thereof. The third crystalline layer is from about 1 to about 50 nm thick and comprises at least one material selected from the group consisting of: Ru, Co, CoCr, CoCrPt, and alloys thereof.

In accordance with further embodiments of the present invention, the layer structure further comprises:

(d) a layer comprised of an amorphous or nano-crystalline material beneath the first crystalline layer, having short range order and mean nearest neighbor atomic spacing with a value similar to the nearest neighbor atomic spacing of the first crystalline layer and comprised of an amorphous or nano-crystalline metal or metal alloy material selected from the group consisting of Ti, TiCr alloys, other Ti-based alloys, Ta-based alloys, FeCoB alloys, FeCo alloys, FeNi alloys, and CoNi alloys.

According to one particular embodiment of the present invention, the first crystalline layer comprises an fcc material, and the first lattice parameter is a [111] lattice parameter. The second crystalline layer comprises an hcp material wherein the second lattice parameter is similar to the first [111] lattice parameter of the first crystalline layer; and the third crystalline layer comprises a different hcp material with a lattice parameter similar to or different from that of the second crystalline layer.

According to another particular embodiment of the invention, the first crystalline layer comprises an fcc material, and the first lattice parameter is a [111] lattice parameter. The second crystalline layer comprises a different fcc material with a second [111] lattice parameter similar to or different from the first [111] lattice parameter of the first crystalline layer. The third crystalline layer comprises an hcp material with a lattice parameter similar to the second [111] lattice parameter of the second crystalline layer.

According to yet another particular embodiment of the present invention, the first crystalline layer comprises, in overlying sequence, a layer of an amorphous or nano-crystalline metal or metal alloy having short range order and a mean nearest neighbor atomic spacing similar to a desired mean nearest neighbor atomic spacing for the first crystalline layer, and a crystalline layer of an fcc material wherein the first lattice parameter is a [111] lattice parameter; the second crystalline layer comprises a different fcc material with a second [111] lattice parameter similar to or different from that of the first [111] lattice parameter of the first crystalline layer; and the third crystalline layer comprises an hcp material with a lattice parameter similar to the second [111] lattice parameter of the second crystalline layer.

According to still another embodiment of the invention, the first crystalline layer comprises an hcp material; the second crystalline layer comprises a different hcp material with a second lattice parameter similar to or different from that of the first lattice parameter of the first crystalline layer; and the third crystalline layer comprises another different hcp material with a lattice parameter similar to or different from that of the second lattice parameter of the second crystalline layer.

Another aspect of the present invention is a perpendicular magnetic recording medium, comprising the above-described layer structure and an overlying perpendicular magnetic recording layer comprising a magnetic material with a strong <0002> growth orientation, wherein the perpendicular magnetic recording layer with a strong <0002> growth orientation comprises a Co-based alloy.

Yet another aspect of the present invention is a perpendicular magnetic recording medium, comprising:

(a) a non-magnetic substrate having a surface; and (b) a layer stack formed over the substrate surface, the layer stack comprising, in overlying sequence from the substrate surface:

(i) a magnetically soft underlayer;

(ii) an interlayer structure for crystallographically orienting a layer of a hexagonal close-packed (hcp) perpendicular magnetic recording material formed thereon; and (iii) an hcp magnetically hard perpendicular main recording layer;

wherein the interlayer structure comprises, in overlying sequence from a surface of said magnetically soft underlayer:

(1) a first crystalline layer of a material having a first lattice parameter and a strong preferred growth orientation;

(2) a second crystalline layer of a material having a second lattice parameter and the same strong preferred growth orientation as the first crystalline layer; and (3) a third crystalline layer of an hcp material, having a [0002] lattice parameter similar to or different from that of the second lattice parameter of the second crystalline layer and a strong <0002> preferred growth orientation; and the second crystalline layer has a lower interfacial energy with the first crystalline layer and a higher interfacial energy with the third crystalline layer, owing to a lower surface energy of the first crystalline layer a higher interfacial energy with the third crystalline layer.

In accordance with embodiments of the invention, the lower surface energy of the first crystalline layer is not greater than about 2.0 $J/m^2$ and the higher surface energy of the second crystalline layer is not less than about 2.7 $J/m^2$.

Preferred embodiments of the present invention include those wherein the second lattice parameter of the second crystalline layer is similar to or different from the first lattice parameter of the first crystalline layer. The first crystalline layer has a melting temperature ($T_m$) not greater than about 2,100° C.; and the second crystalline layer has a melting temperature ($T_m$) not less than about 2,100° C. The first crystalline layer is from about 1 to about 50 nm thick and comprises at least one material selected from the group consisting of: Al, Ag, Au, Cu, Zn, Ni, Ti, Pd, Pt, Mg, Ca, Be, Sc, Sr, La, Zr, Rh, Cd, Tl, Pb, Se, Te, Gd, Nd, Pr, Tb, Dy, Ho, Er, Tm, Yb, Lu, Mn, Fe, Cr, and alloys thereof. The second crystalline layer is from about 1 to about 50 nm thick and comprises at least one material selected from the group consisting of: Ru, Re, Ir, Os, Co, Pt, Ti, Hf, Th, Gd, Mo, Nb, Ta, W, and alloys thereof. The third crystalline layer is from about 1 to about 50 nm thick and comprises at least one material selected from the group consisting of: Ru, Co, CoCr, CoCrPt, and alloys thereof.

According to embodiments of the present invention, the medium further comprises:

(c) a layer intermediate the interlayer structure and the magnetically soft interlayer, comprised of an amorphous or nano-crystalline material having short range order and mean nearest neighbor atomic spacing with a value similar to the nearest neighbor atomic spacing of the first crystalline layer, comprising an amorphous metal or metal alloy selected from the group consisting of: Ti, TiCr alloys, other Ti-based alloys, Ta-based alloys, FeCoB alloys, FeCo alloys, FeNi alloys, and CoNi alloys.

According to particular embodiments of the invention, the interlayer structure is selected from the group consisting of:

structure (1), wherein the first crystalline layer (a) comprises an fcc material, and the first lattice parameter is a [111] lattice parameter. The second crystalline layer comprises an hcp material wherein the second lattice parameter is similar to the first [111] lattice parameter of the first crystalline layer; and the third crystalline layer comprises a different hcp material with a third lattice parameter similar to or different from that of the second crystalline layer;

structure (2), wherein the first crystalline layer comprises an fcc material, and the first lattice parameter is a [111] lattice parameter. The second crystalline layer comprises a different fcc material with a second [111] lattice parameter similar to or different from the first [111] lattice parameter of the first crystalline layer; and the third crystalline layer comprises an hcp material with a lattice parameter similar to the second [111] lattice parameter of the second crystalline layer;

structure (3), wherein the first crystalline layer comprises, in overlying sequence, a layer of an amorphous or nanocrystalline metal or metal alloy having short range order and a mean nearest neighbor atomic spacing similar to a desired mean nearest neighbor atomic spacing for the first crystalline layer, and a crystalline layer of an fcc material wherein the first lattice parameter is a [111] lattice parameter; the second crystalline layer comprises a different fcc material with a second [111] lattice parameter similar to or different from that of the first [111] lattice parameter of the first crystalline layer; and the third crystalline layer comprises an hcp material with a lattice parameter similar to the second [111] lattice parameter of the second crystalline layer; and structure (4), wherein the first crystalline layer comprises an hcp material, the second crystalline layer comprises a different hcp material with a second lattice parameter similar to or different from that of the first lattice parameter of the first crystalline layer; and the third crystalline layer comprises another different hcp material with a lattice parameter similar to or different from that of the second lattice parameter of the second crystalline layer.

Embodiments of the present invention include those wherein the non-magnetic substrate comprises at least one material selected from the group consisting of Al, NiP-plated Al, Al-Mg alloys, other Al-based alloys, other non-magnetic metals, other non-magnetic alloys, glass, ceramics, polymers, glass-ceramics, and composites and/or laminates thereof; the magnetically soft underlayer is an amorphous metal material comprised of Fe containing at least one element selected from the group consisting of Co, B, P, Si, C, Zr, Nb, Hf, Ta, Al, Cu, Ag, and Au; and the magnetically hard perpendicular main recording layer includes at least one layer of an hcp ferromagnetic material comprised of Co containing at least one element selected from the group consisting of Pt, Cr, Ta, B, Cu, W, Mo, and Nb.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, and in which like reference numerals are employed throughout to designate similar features, wherein.

DESCRIPTION OF THE INVENTION

The present invention is based upon recognition by the inventors that very high areal recording density perpendicular magnetic recording media which utilize magnetic alloys as the material of the perpendicular main recording layer, e.g., hcp CoCr-based alloys with strong <0002> preferred growth orientation, can be reliably and controllably fabricated with optimum crystallographic properties (e.g., growth orientation), grain size, and separation of adjacent grains of the main recording layer, by appropriate design and selection of materials of a non-magnetic interlayer structure positioned between the magnetically soft underlayer and the magnetically hard main recording layer.

A feature, therefore, of the present invention, is selection of materials and arrangement of a plurality of stacked layers of different materials for forming improved intermediate layer structures which provide:

1. improved control and increased strength of the preferred crystallographic orientation of the main recording layer, e.g., <0002> in the case of hcp Co-based alloys;
2. improved control of the grain size (preferably small) and grain distribution of the main recording layer; and
3. improved physical separation between adjacent grains of the main recording layer, which feature is particularly desirable and important when the latter is formed by a low temperature and/or reactive sputtering process, so that growth of Co-oxide occurs in the boundaries between adjacent grains.

Figure 1:
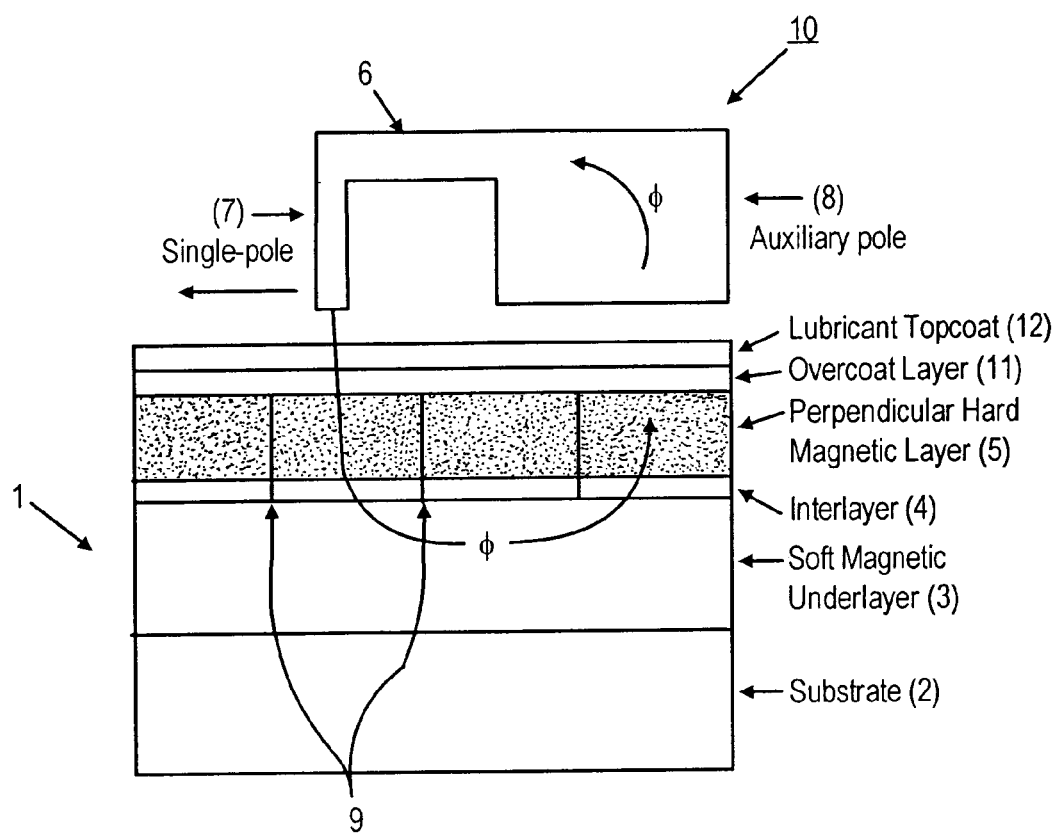
FIG. 1 schematically illustrates, in simplified cross-sectional view, a portion of a magnetic recording, storage, and retrieval system comprised of a single-pole transducer head and a conventional perpendicular type magnetic recording medium including soft magnetic, non-magnetic intermediate, a hard perpendicular recording layers.
Figure 2:
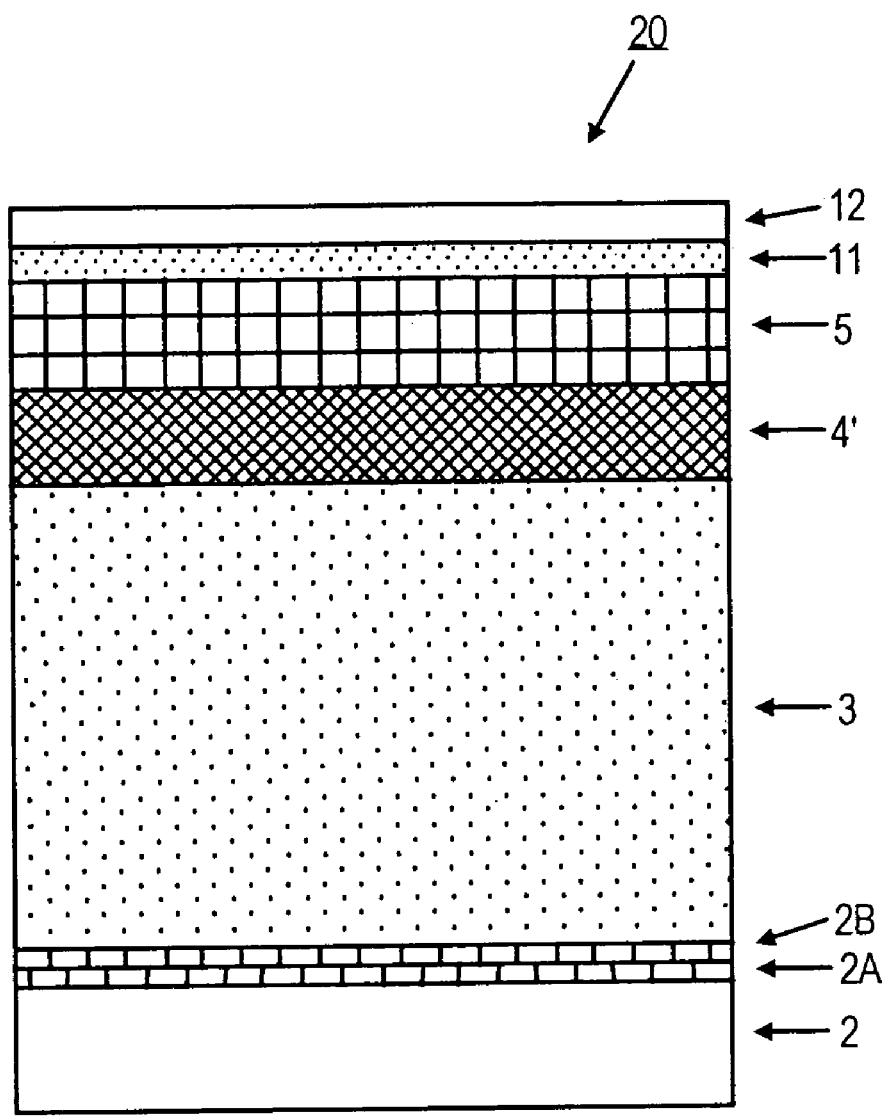
FIG. 2 schematically illustrates, in simplified cross-sectional view, a portion of a perpendicular magnetic recording medium including an improved non-magnetic interlayer structure according to the invention.

Referring now to FIG. 2, schematically illustrated therein, in simplified perspective view, is a portion of a perpendicular magnetic recording medium 20 fabricated according to the principles of the present invention. More specifically, perpendicular magnetic recording medium 20 resembles the conventional perpendicular magnetic recording medium 1 of FIG. 1, and comprises a series of thin-film layers arranged in an overlying (stacked) sequence on a suitable non-magnetic substrate 2, and includes a soft magnetic underlayer 3, a non-magnetic interlayer structure 4' according to the present invention, a perpendicularly oriented, magnetically hard (main) recording layer 5, a protective overcoat layer 11, and a lubricant topcoat layer 12.

In accordance with embodiments of the present invention, e.g., as with hard disks, the non-magnetic substrate 2 is sufficiently thick as to provide medium 20 with a desired rigidity and comprises a material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof. Substrate 2 may further comprise, in overlying sequence from the surface thereof, a plating layer 2A and an adhesion layer 2B. A suitable material for plating layer 2A, as when substrate 2 is comprised of Al or an Al alloy such as Al—Mg, is amorphous NiP, and suitable materials for adhesion layer 2B include Cr, CrTi, Ti, and TiNb.

Overlying substrate 2 is a magnetically soft underlayer 3, greater than about 20 nm thick, preferably from about 40 to about 200 nm thick, comprised of Fe containing at least one element selected from the group consisting of Co, Ni, B, P, Si, C, Zr, Nb, Hf, Ta, Al, Cu, Ag, and Au.

Non-magnetic interlayer structure 4' according to the present invention is interposed between the magnetically soft underlayer 3 and the magnetically hard (main) perpendicular recording layer 5 and is described in detail below.

Magnetically hard perpendicular recording layer 5 is from about 5 to about 25 nm thick, and typically includes at least one layer of an hcp ferromagnetic alloy material with strong <0002> preferred growth orientation, preferably comprised of Co containing at least one element selected from the group consisting of Pt, Cr, Ta, Ti, Si, O, B, Cu, W, Mo, and Nb.

Completing the layer stack of medium 20 are protective overcoat layer 11 atop recording layer 5, typically a layer of a carbon-containing material <10 nm thick, and a lubricant topcoat layer 12 atop the protective overcoat layer 11, typically a layer of a perfluoropolyether <5 Å thick.

According to the invention, non-magnetic interlayer 4' is comprised of a multi-layer structure which, inter alia, crystallographically orients growth of the perpendicular recording layer 5 along a preferred direction, e.g., the aforementioned hcp CoCr-based alloys with <0002> preferred growth orientation, and comprises, in overlying sequence from the magnetically soft underlayer 3:

(a) a first crystalline layer of a material having a first lattice parameter and a strong preferred growth orientation;

(b) a second crystalline layer of a material having a second lattice parameter and the same strong preferred growth orientation as the first crystalline layer; and (c) a third crystalline layer of a hcp material having a lattice parameter similar to or different from the second lattice parameter of the second crystalline layer and a strong preferred growth orientation, wherein:

wherein the second crystalline layer has a lower interfacial energy with the first crystalline layer and a higher interfacial energy with the third crystalline layer, owing to a lower surface energy of the first crystalline layer a higher interfacial energy with the third crystalline layer.

According to embodiments of the invention, the lower surface energy of the first crystalline layer is not greater than about 2.0 J/m$^2$ and the higher surface energy of the second crystalline layer is not less than about 2.7 J/m$^2$.

As utilized herein, the expression "strong preferred growth orientation" refers to films which are oriented in a single direction and the integrated intensity of the largest peak (as determined by X-ray analysis) of the family of planes of the specified orientation is at least or about 5 times greater than any other observed peak. In addition, the expression "strong preferred growth orientation" generally implies an X-ray rocking curve FWHM less than or about 10 degrees.

According to embodiments of the invention:

(1) the third crystalline layer of a hcp material has a [0002] lattice parameter similar to or different from the second lattice parameter of the second crystalline layer and a strong <0002> preferred growth orientation;

(2) the second lattice parameter of the second crystalline layer is similar to or different from that of the first lattice parameter of the first crystalline layer;

(3) the first crystalline layer has a melting temperature ($T_m$) not greater than about 2,100° C.;

(4) the second crystalline layer has a melting temperature ($T_m$) not less than about 2,100° C.;

(5) the first crystalline layer is from about 1 to about 50 nm thick and comprises at least one material selected from the group consisting of: Al, Ag, Au, Cu, Zn, Ni, Ti, Pd, Pt, Mg, Ca, Be, Sc, Sr, La, Zr, Rh, Cd, Tl, Pb, Se, Te, Gd, Nd, Pr, Tb, Dy, Ho, Er, Tm, Yb, Lu, Mn, Fe, Cr, and alloys thereof;

(6) the second crystalline layer is from about 1 to about 50 nm thick and comprises at least one material selected from the group consisting of: Ru, Re, Ir, Os, Co, Pt, Ti, Hf, Th, Gd, Mo, Nb, Ta, W, and alloys thereof;

(7) the third crystalline layer is from about 1 to about 50 nm thick and comprises at least one material selected from the group consisting of: Ru, Co CoCr, CoCrPt, and alloys thereof; and (8) interlayer structure 4' may further comprise:

(d) a layer comprised of an amorphous or nano-crystalline material beneath the first crystalline layer, having short range order and mean nearest neighbor atomic spacing with a value similar to the nearest neighbor atomic spacing of the first crystalline layer and comprised of an amorphous metal or metal alloy material selected from the group consisting of: Ti, TiCr alloys, other Ti-based alloys, Ta-based alloys, FeCoB alloys, FeCo alloys, FeNi alloys, and CoNi alloys.

According to a first particular embodiment of interlayer 4' of the present invention, the first crystalline layer comprises an fcc material, and the first lattice parameter is a [111] lattice parameter. The second crystalline layer comprises an hcp material wherein the second lattice parameter is similar to the first [111] lattice parameter of the first crystalline layer; and the third crystalline layer comprises a different hcp material with a lattice parameter similar to or different from that of the second crystalline layer.

According to a second particular embodiment of the invention, the first crystalline layer comprises an fcc material, and the first lattice parameter is a [111] lattice parameter. The second crystalline layer comprises a different fcc material with a second [111] lattice parameter similar to or different from the first [111] lattice parameter of the first crystalline layer; and the third crystalline layer comprises an hcp material with a lattice parameter similar to the second [111] lattice parameter of the second crystalline layer.

According to a third particular embodiment of the present invention, the first crystalline layer comprises, in overlying sequence, a layer of an amorphous or nanocrystalline metal or metal alloy having short range order and a mean nearest neighbor atomic spacing similar to a desired mean nearest neighbor atomic spacing for the first crystalline layer, and a crystalline layer of an fcc material wherein the first lattice parameter is a [111] lattice parameter; the second crystalline layer comprises a different fcc material with a second [111] lattice parameter similar to or different from that of the first [111] lattice parameter of the first crystalline layer; and the third crystalline layer comprises an hcp material with a lattice parameter similar to the second [111] lattice parameter of the second crystalline layer.

According to a fourth particular embodiment of the invention, the first crystalline layer comprises an hcp material; the second crystalline layer comprises a different hcp material with a second lattice parameter similar to or different from that of the first lattice parameter of the first crystalline layer; and the third crystalline layer comprises yet another hcp material with a lattice parameter similar to or different from that of the second lattice parameter of the second crystalline layer.

Each of the thin film layers 2A, 2B, 3, the component layers of intermediate layer 4', and 5 and the protective overcoat layer 11 may be formed by utilizing at least one physical vapor deposition (PVD) method selected from sputtering, reactive sputtering, vacuum evaporation, ion plating, ion beam deposition (IBD), and plasma deposition, or at least one chemical vapor deposition method selected from CVD, MOCVD, and PECVD; and lubricant topcoat layer 12 may be formed by utilizing at least one method selected from dipping, spraying, and vapor deposition.

According to a general scheme or procedure for fabricating preferred embodiments of the invention, an interlayer structure 4' is formed by depositing (as by sputtering) an amorphous or nano-crystalline metal or metal alloy layer on a surface of a magnetically soft underlayer 3, followed by deposition thereon of a first fcc or hcp crystalline layer (i.e., a <0001> hcp layer) having a lattice parameter compatible with the short range order of the amorphous or nano-crystalline layer and a low interface energy with the second crystalline layer to be deposited thereon.

The second crystalline layer is deposited as by sputtering and grows coherently on the first crystalline layer and maintains a preferred growth orientation, e.g., a hcp <0001> growth orientation, but one of the lattice parameter and crystal structure is changed vis-à-vis the first crystalline layer. In addition, the second crystalline layer has a high interfacial energy with the third crystalline layer to be deposited thereon.

The third crystalline layer of an hcp material, typically a Co-based alloy, is also deposited by sputtering and grows coherently on the second crystalline layer and maintains a basal plane growth orientation as either an fcc <111> or an hcp <0002> growth orientation, but one of the lattice parameter and crystal structure is changed vis-à-vis the second crystalline layer.

In the above scheme/procedure, the preferred growth orientation of the first crystalline layer is improved by selecting a material which is chemically compatible with that of the adjacent second crystalline layer, and has a low interfacial energy therewith, owing to a low first crystalline layer surface energy not greater than about 2.0 J/m$^2$. A metallic alloy advantageously utilized for the first crystalline layer typically has a melting temperature not greater than about 2,100° C., requisite crystal structure, lattice parameter, and chemical properties, and is preferred for forming a smooth, coherent interface with the second crystalline layer, as well as a strong preferred growth orientation of the latter.

The grain size of the second crystalline layer is advantageously reduced by utilizing a material which is chemically compatible with the materials of the adjacent first and third crystalline layers and has a high interfacial energy with the third crystalline layer, owing to a second crystalline layer surface energy not less than about 2.7 J/m$^2$. A metallic alloy advantageously utilized for the second crystalline layer typically has a higher melting temperature (i.e., not less than about 2,100° C.) than those of the first and third crystalline layers, as well as requisite crystal structure, lattice parameter, and chemical properties for forming the small-grained materials of the second and third crystalline layers.

Reactive sputtering of the magnetically hard perpendicular recording layer 5 in an Ar/O$_2$ atmosphere is preferred for enabling formation of an intergranular Co oxide when layer 5 is comprised of a Co-based magnetic alloy. The target utilized for sputtering the magnetically hard recording layer may comprise Co with one or more added elements, selected from the group consisting of Pt, Cr, Ta, B, Cu, W, Mo, and Nb. The magnetic recording layer and the interlayer structures according to the invention may be formed at low temperatures, e.g., <~400° K, or grown at higher temperatures, generally >~420° K and <~600° K.

In short, the compositions (i.e., materials), thicknesses, crystallographic types, and arrangements of the component layers of the non-magnetic interlayer structure 4' and the magnetic alloy-based, perpendicular hard magnetic recording layer 5 are selected as to act in concert to provide medium 20 with improved performance characteristics vis-à-vis medium 1, which improvement is largely attributable to the strong crystal growth orientation of perpendicular main recording layer 5 provided by the improved interlayer structures 4' of the present invention.

Thus, the present invention advantageously provides improved, high areal density, magnetic alloy-based perpendicular magnetic data/information and storage retrieval media including an improved non-magnetic interlayer which provides advantageous crystal lattice matching and orientation of the magnetic recording layer which afford improved media performance characteristics. The media of the present invention are especially useful when employed in conjunction with single-pole recording/retrieval transducer heads and enjoy particular utility in high recording density systems for computer-related applications. In addition, the inventive media can be fabricated by means of conventional media manufacturing technologies, e.g., sputtering.

In the previous description, numerous specific details are set forth, such as specific materials, structures, processes, etc., in order to provide a better understanding of the present invention. However, the present invention can be practiced without resorting to the details specifically set forth. In other instances, well-known processing materials and techniques have not been described in detail in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A layer structure for crystallographically orienting a layer of a hexagonal close-packed (hcp) material formed thereon, comprising, in overlying sequence:
   (a) a first crystalline layer of a material having a first lattice parameter and a strong preferred growth orientation;
   (b) a second crystalline layer of a material having a second lattice parameter and the same strong preferred growth orientation as said first crystalline layer; and
   (c) a third crystalline layer of a hcp material having a lattice parameter similar to or different from said second lattice parameter of said second crystalline layer and a strong preferred growth orientation;
   wherein said second crystalline layer has a lower interfacial energy with said first crystalline layer and a higher interfacial energy with said third crystalline layer, owing to a lower surface energy of said first crystalline layer and a higher surface energy of said second crystalline layer, and said second crystalline layer has a melting temperature ($T_m$) not less than about 2,100° C.

2. The layer structure as in claim 1, wherein:

said lower surface energy of said first crystalline layer is not greater than about 2.0 J/m$^2$ and said higher surface energy of said second crystalline layer is not less than about 2.7 J/m$^2$.

3. The layer structure as in claim 1, wherein:

said third crystalline layer of a hcp material has a [0002] lattice parameter similar to or different from said second lattice parameter of said second crystalline layer and a strong <0002> preferred growth orientation.

4. The layer structure as in claim 1, wherein:

said first crystalline layer has a melting temperature ($T_m$) not greater than about 2,100° C.

5. The layer structure as in claim 1, wherein:

said first crystalline layer is from about 1 to about 50 nm thick and comprises at least one material selected from the group consisting of: Al, Ag, Au, Cu, Zn, Ni, Ti, Pd, Pt, Mg, Ca, Be, Sc, Sr, La, Zr, Rh, Cd, Tl, Pb, Se, Te, Gd, Nd, Pr, Tb, Dy, Ho, Er, Tm, Yb, Lu, Mn, Fe, Cr, and alloys thereof.

6. The layer structure as in claim 1, wherein:

said second crystalline layer is from about 1 to about 50 nm thick and comprises at least one material selected from the group consisting of: Ru, Re, Ir, Os, Mo, Nb, Ta, W, and alloys thereof.

7. The layer structure as in claim 1, wherein:

said third crystalline layer is from about 1 to about 50 nm thick and comprises at least one material selected from the group consisting of: Ru, Co, CoCr, CoCrPt, and alloys thereof.

8. The layer structure as in claim 1, further comprising:

(d) a layer comprised of an amorphous or nano-crystalline material beneath said first crystalline layer.

9. The layer structure as in claim 8, wherein:

said amorphous or nano-crystalline layer comprises a material having short range order and mean nearest neighbor atomic spacing with a value similar to the nearest neighbor atomic spacing of said first crystalline layer.

10. The layer structure as in claim 9, wherein:

said amorphous or nano-crystalline layer comprises an amorphous or nano-crystalline metal or metal alloy selected from the group consisting of: Ti, TiCr alloys, other Ti-based alloys, Ta-based alloys, FeCoB alloys, FeCo alloys, FeNi alloys, and CoNi alloys.

11. The layer structure as in claim 1, wherein:

said first crystalline layer comprises an fcc material and said first lattice parameter is a [111] lattice parameter;

said second crystalline layer comprises an hcp material wherein said second lattice parameter is similar to said first [111] lattice parameter of said first crystalline layer; and said third crystalline layer comprises a different hcp material with a lattice parameter similar to or different from that of said second crystalline layer.

12. The layer structure as in claim 1, wherein:

said first crystalline layer comprises an fcc material and said first lattice parameter is a [111] lattice parameter;

said second crystalline layer comprises a different fcc material with a second [111] lattice parameter similar to or different from that of said first [111] lattice parameter of said first crystalline layer; and said third crystalline layer comprises an hcp material with a lattice parameter similar to said second [111] lattice parameter of said second crystalline layer.

13. The layer structure as in claim 1, wherein:

said first crystalline layer comprises, in overlying sequence, a layer of an amorphous or nano-crystalline metal or metal alloy having short range order and a mean nearest neighbor atomic spacing similar to a desired mean nearest neighbor atomic spacing for said first crystalline layer, and a crystalline layer of an fcc material wherein said first lattice parameter is a [111] lattice parameter;

said second crystalline layer comprises a different fcc material with a second [111] lattice parameter similar to or different from that of said first [111] lattice parameter of said first crystalline layer; and said third crystalline layer comprises an hcp material with a lattice parameter similar to said second [111] lattice parameter of said second crystalline layer.

14. The layer structure as in claim 1, wherein:

said first crystalline layer comprises an hcp material;

said second crystalline layer comprises a different hcp material with a second lattice parameter similar to or different from that of said first lattice parameter of said first crystalline layer; and said third crystalline layer comprises another different hcp material with a lattice parameter similar to or different from that of said second lattice parameter of said second crystalline layer.

15. A perpendicular magnetic recording medium, comprising the layer structure of claim 3 and an overlying perpendicular magnetic recording layer comprising a magnetic material with a strong <0002> growth orientation.

16. The magnetic recording medium as in claim 15, wherein:

said perpendicular magnetic recording layer with a strong <0002> growth orientation comprises a Co-based alloy.

17. A perpendicular magnetic recording medium, comprising:

(a) a non-magnetic substrate having a surface; and (b) a layer stack formed over said substrate surface, said layer stack comprising, in overlying sequence from said substrate surface:

(i) a magnetically soft underlayer;

(ii) an interlayer structure for crystallographically orienting a layer of a hexagonal close-packed (hcp) perpendicular magnetic recording material formed thereon; and (iii) an hcp magnetically hard perpendicular main recording layer;

wherein said interlayer structure comprises, in overlying sequence from a surface of said magnetically soft underlayer:

(1) a first crystalline layer of a material having a first lattice parameter and a strong preferred growth orientation;

(2) a second crystalline layer of a material having a second lattice parameter and the same strong preferred growth orientation as said first crystalline layer; and (3) a third crystalline layer of an hcp material, having a [0002] lattice parameter similar to or different from that of said second lattice parameter of said second crystalline layer and a strong <0002> preferred growth orientation; and said second crystalline layer has a lower interfacial energy with said first crystalline layer and a higher interfacial energy with said third crystalline layer, owing to a lower surface energy of said first crystalline layer and a higher surface energy of said second crystalline layer, and said second crystalline layer has a melting temperature ($T_m$) not less than about 2,100° C.

18. The recording medium as in claim 17, wherein:
said lower surface energy of said first crystalline layer is not greater than about 2.0 J/m² and said higher surface energy of said second crystalline layer is not less than about 2.7 J/m².

19. The recording medium as in claim 17, wherein:
said second lattice parameter of said second crystalline layer is similar to or different from said first lattice parameter of said first crystalline layer; and
said first crystalline layer has a melting temperature ($T_m$) not greater than about 2,100° C.

20. The recording medium as in claim 17, wherein:
said first crystalline layer is from about 1 to about 50 nm thick and comprises at least one material selected from the group consisting of: Al, Ag, Au, Cu, Zn, Ni, Ti, Pd, Pt, Mg, Ca, Be, Sc, Sr, La, Zr, Rh, Cd, Tl, Pb, Se, Te, Gd, Nd, Pr, Tb, Dy, Ho, Er, Tm, Yb, Lu, Mn, Fe, Cr, and alloys thereof;
said second crystalline layer is from about 1 to about 50 nm thick and comprises at least one material selected from the group consisting of: Ru, Re, Ir, Os, Co, Pt, Ti, Hf, Th, Gd, Mo, Nb, Ta, W, and alloys thereof; and
said third crystalline layer is from about 1 to about 50 nm thick and comprises at least one material selected from the group consisting of: Ru, Co, CoCr, CoCrPt, and alloys thereof.

21. The recording medium as in claim 17, further comprising:
(c) a layer intermediate said interlayer structure and said magnetically soft interlayer, comprised of an amorphous or nano-crystalline metal or metal alloy having short range order and mean nearest neighbor atomic spacing with a value similar to the nearest neighbor atomic spacing of said first crystalline layer, selected from the group consisting of: Ti, TiCr alloys, other Ti-based alloys, Ta-based alloys, FeCoB alloys, FeCo alloys, FeNi alloys, and CoNi alloys.

22. The recording medium as in claim 17, wherein said interlayer structure is selected from the group consisting of:
structure (1), wherein said first crystalline layer (a) comprises an fcc material and said first lattice parameter is a [111] lattice parameter; said second crystalline layer comprises an hcp material wherein said second lattice parameter is similar to said first [111] lattice parameter of said first crystalline layer (a); and said third crystalline layer comprises a different hcp material with a third lattice parameter similar to or different from that of said second crystalline layer;
structure (2), wherein said first crystalline layer comprises an fcc material and said first lattice parameter is a [111] lattice parameter; said second crystalline layer comprises a different fcc material with a second [111] lattice parameter similar to or different from said first [111] lattice parameter of said first crystalline layer; and said third crystalline layer comprises an hcp material with a lattice parameter similar to said second [111] lattice parameter of said second crystalline layer;
structure (3), wherein said first crystalline layer comprises, in overlying sequence, a layer of an amorphous or nano-crystalline metal or metal alloy having short range order and a mean nearest neighbor atomic spacing similar to a desired mean nearest neighbor atomic spacing for said first crystalline layer, and a crystalline layer of an fcc material wherein said first lattice parameter is a [111] lattice parameter; said second crystalline layer comprises a different fcc material with a second [111] lattice parameter similar to or different from that of said first [111] lattice parameter of said first crystalline layer; and said third crystalline layer comprises an hcp material with a lattice parameter similar to said second [111] lattice parameter of said second crystalline layer; and
structure (4), wherein said first crystalline layer comprises an hcp material; said second crystalline layer comprises a different hcp material with a second lattice parameter similar to or different from that of said first lattice parameter of said first crystalline layer; and said third crystalline layer comprises another different hcp material with a lattice parameter similar to or different from that of said second lattice parameter of said second crystalline layer.

23. The recording medium as in claim 17, wherein:
said non-magnetic substrate comprises at least one material selected from the group consisting of Al, NiP-plated Al, Al—Mg alloys, other Al-based alloys, other non-magnetic metals, other non-magnetic alloys, glass, ceramics, polymers, glass-ceramics, and composites and/or laminates thereof;
said magnetically soft underlayer is an amorphous metal material comprised of Fe containing at least one element selected from the group consisting of Co, B, P, Si, C, Zr, Nb, Hf, Ta, Al, Cu, Ag, and Au; and
said magnetically hard perpendicular main recording layer includes at least one layer of an hcp <0002> growth-oriented ferromagnetic material comprised of Co containing at least one element selected from the group consisting of Pt, Cr, Ta, B, Cu, W, Mo, and Nb.

24. A layer structure for crystallographically orienting a layer of a hexagonal close-packed (hcp) material formed thereon, comprising, in overlying sequence:
(a) a first crystalline layer of a material having a first lattice parameter and a strong preferred growth orientation;
(b) a second crystalline layer of a material having a second lattice parameter and the same strong preferred growth orientation as said first crystalline layer; and
(c) a third crystalline layer of a hcp material having a lattice parameter similar to or different from said second lattice parameter of said second crystalline layer and a strong preferred growth orientation;
wherein said second crystalline layer has a lower interfacial energy with said first crystalline layer and a higher interfacial energy with said third crystalline layer, owing to a lower surface energy of said first crystalline layer and a higher surface energy of said second crystalline layer,
said second crystalline layer comprises an hcp material,
said third crystalline layer comprises a different hcp material, and
said second crystalline layer comprises at least one material selected from the group consisting of: Ru, Re, Ir, Os, Co, Pt, Hf, Th, Gd, Mo, Nb, Ta, W, and alloys thereof.

* * * * *